Nov. 11, 1924.
E. KREISSIG
SPRING
Filed July 5, 1921
1,515,346
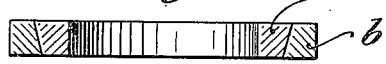
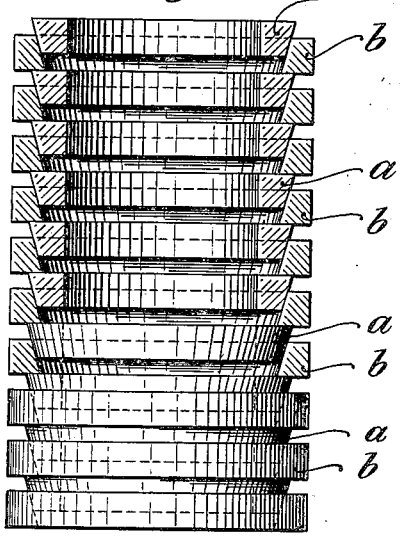
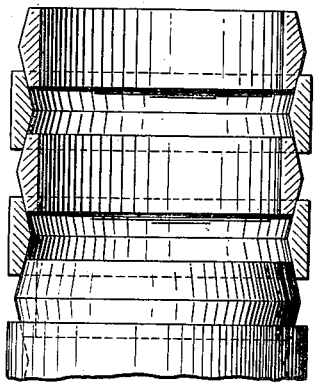
Inventor Patented Nov. 11, 1924.

1,515,346

UNITED STATES PATENT OFFICE.

ERNEST KREISSIG, OF UERDINGEN, GERMANY.

SPRING.

Application filed July 5, 1921. Serial No. 482,569.

*To all whom it may concern:*

Be it known that I, ERNST KREISSIG, a citizen of the German Republic, and residing at Uerdingen, Germany, have invented certain new and useful Improvements in Springs, of which the following is a specification.

The present invention relates to a new type of springs especially adapted for buffers and which differs from those heretofore known in that contrary to the existing flexional and torsional springs it will operate under tensional or compressive strains only, or under both kinds of strains simultaneously.

In the accompanying drawing Fig. 1 is a cross section through a spring according to the present invention. Fig. 2 is a cross section through a spring according to the present invention when under tension, and Fig. 3 is a spring system according to the present invention.

As will be seen from the aforementioned drawing the spring is composed of, at least, two solid rings $a$ and $b$ of which the one is conically formed on its inner surface whilst the other is conically formed on its outer surface.

The angles of the taper of these conical surfaces are the same and so adapted to each other that, when the spring is not under tension, the inner ring $a$ will project by a given length out of the outer ring $b$ (see Fig. 1). When, now, a pressure is exerted on the two rings, the wedge effect of the two tapers will produce an outward pressure on the outer ring and an inward pressure on the inner ring. In consequence thereof a tangential tensile strain is produced in the outer ring $b$ and a similar compression strain in the inner ring $a$, whereby the spring effect is caused. The latter is several times greater than with any other known type of spring, as the capacity of the spring according to the present invention is, for a given volume, at least three times as great as with the best flexional or torsional spring known.

The taper of the conical surfaces should be such that the spring will, by all means, return into its original position, as far as the friction between the conical surfaces is concerned. The latter will, on the spring returning, have a very effective braking influence which will be of great advantage, in particular with buffer springs.

In Fig. 3 a spring system is shown which consists of the hereinbefore described spring elements. It is obvious that also several such systems may be disposed within each other so that it will be possible to obtain a hereto unknown high spring effect within a very small volume. For the outer or the inner ring also non-elastic parts which have a merely radial effect may be substituted, so that only one ring has the spring effect. Furthermore two rings may be combined to a twin ring as shown in Fig. 4, and the outer ring may be made of a different material than the inner ring, whereby still more favorable effects will be secured.

I claim:

1. A friction spring unit of the character set forth, comprising two telescopable integrally closed annuli presenting complemental tapered friction surfaces the taper being such so as to permit compression of the spring in response to an external force.

2. A friction spring unit of the character set forth, comprising two telescopable integrally closed annuli having complemental tapered friction faces, the taper being such so as to permit compression and rebound of the spring in response to an external force thus preventing binding of the spring upon release.

3. A friction spring unit of the character set forth, comprising two telescopable integrally closed annuli presenting complemental slightly tapered friction surfaces of a character to place said annuli under interdependent frictional and radially tensional and compressional strains when the unit is compressed in the direction of its axis.

4. A friction spring device of the character set forth, comprising a series of coaxially arranged spring units, each unit comprising an integrally closed outer annulus and an integrally closed inner annulus, said annuli presenting complemental tapered friction surfaces and each inner annulus designed for reciprocal telescoping displacement within its complemental outer annulus, the taper being such so as to permit compression of the spring in response to an external force.

5. A friction spring unit comprising telescopable, integrally closed annuli having complemental friction faces, each annulus having a pair of oppositely tapered friction faces, the taper being such so as to permit compression of the spring in response to an external force.

In testimony whereof I affix my signature.

ERNST KREISSIG.